(12) United States Patent
Hildebrand et al.

(10) Patent No.: US 8,397,394 B2
(45) Date of Patent: Mar. 19, 2013

(54) METHOD AND DEVICE FOR THE INITIAL MEASUREMENT OF A WORKPIECE, AND THE PROCESSING OF A WORKPIECE

(75) Inventors: Peter Hildebrand, Pfronten (DE); Gottfried Reinicke, Kempten (DE)

(73) Assignee: Sauer GmbH Lasertec, Kempten (DE)

( * ) Notice: Subject to any disclaimer, the term of this patent is extended or adjusted under 35 U.S.C. 154(b) by 488 days.

(21) Appl. No.: 12/594,358

(22) PCT Filed: Apr. 1, 2008

(86) PCT No.: PCT/EP2008/002583
§ 371 (c)(1),
(2), (4) Date: Mar. 24, 2010

(87) PCT Pub. No.: WO2008/119549
PCT Pub. Date: Oct. 9, 2008

(65) Prior Publication Data
US 2010/0176099 A1    Jul. 15, 2010

(30) Foreign Application Priority Data
Apr. 3, 2007 (DE) .......................... 10 2007 016 056

(51) Int. Cl.
*G01B 5/004* (2006.01)
(52) U.S. Cl. ........................................ 33/503
(58) Field of Classification Search ...................... 33/503
See application file for complete search history.

(56) References Cited

U.S. PATENT DOCUMENTS

| | | |
|---|---|---|
| 6,611,731 B2 | 8/2003 | Duffin |
| 6,959,572 B2 * | 11/2005 | Lawrence et al. ............ 72/31.03 |
| 7,324,217 B2 * | 1/2008 | Herrmann et al. ............ 356/606 |
| 2003/0120377 A1 | 6/2003 | Hooke et al. |

FOREIGN PATENT DOCUMENTS

| | | |
|---|---|---|
| DE | 31 19 566 A1 | 9/1982 |
| DE | 41 04 602 C1 | 4/1992 |
| DE | 196 31 620 A1 | 12/1998 |
| EP | 1 710 533 A | 11/2006 |
| JP | 2038804 | 2/1990 |

(Continued)

OTHER PUBLICATIONS

International Preliminary Report and Written Opinion dated Nov. 19, 2009.

*Primary Examiner* — William D Coleman
(74) *Attorney, Agent, or Firm* — Perman & Green, LLP

(57) ABSTRACT

A method for workpiece levelling includes mounting the workpiece in a machine tool, measuring the position of the workpiece in the mounting and determining a translatory offset xv, yv, zv and a rotatory offset $\lambda v$, $\beta v$, $\phi v$ of the factual workpiece mounting compared to the ideal mounting from the measurement results and from a workpiece data forming an initial data set related to the ideal mounting, wherein for obtaining another initial data set a plurality of surface points of the mounted workpiece are measured in their position xn, yn, zn in space, the data of one of the initial data sets are varied a plurality of times in accordance with plural translatory and rotatory displacements for obtaining a plurality of varied data sets, from the varied data sets and their base data set the one data set is determined that represents a surface with a lowest deviation measure compared to a surface represented by the other of the initial data sets, and the translatory offset xv, yv, zv and the rotatory offset $\lambda v$, $\beta v$, $\phi v$ is determined from the translatory and rotatory displacement of the determined data set.

16 Claims, 4 Drawing Sheets

FOREIGN PATENT DOCUMENTS

| | | |
|---|---|---|
| JP | 06288763 | 10/1994 |
| JP | 7244737 | 9/1995 |
| JP | 7245261 | 9/1995 |
| JP | 07260464 | 10/1995 |
| JP | 2001133244 | 5/2001 |
| JP | 2006052998 | 2/2006 |
| JP | 2006289524 | 10/2006 |
| WO | 2005/030437 A | 7/2005 |

* cited by examiner

METHOD AND DEVICE FOR THE INITIAL MEASUREMENT OF A WORKPIECE, AND THE PROCESSING OF A WORKPIECE

CROSS REFERENCE TO RELATED APPLICATIONS

This application is the National Stage of International Application No. PCT/EP2008/002583 International Filing Date, 1 Apr. 2008, which designated the United States of America, and which International Application was published under PCT Article 21 (2) as WO Publication No. WO2008/119549 A1 and which claims priority from German Application No. 10 2007 016 056.0 filed on 3 Apr. 2007, the disclosures of which are incorporated herein by reference in their entireties.

BACKGROUND

1. Field

The disclosed embodiments relate to a method and an apparatus for work-piece levelling and for workpiece machining according to the preambles of the independent patent claims. Such a method has been known from U.S. Pat. No. 6,611,731.

2. Brief Description of Related Developments

In very precise numerically controlled machine tools, such as a laser ablation machine, manufacturing accuracies down to some few micrometers can be achieved. Usually, however, such a precise machining is only useful when the workpiece position is of at least the same or similar accuracy, because then the very precise machining in accordance with machining data relating to an ideal mounting is not compromised by a real mounting that may have a translatory or rotatory offset against the ideal mounting.

Often, however, it is not possible to mount workpieces with a precision such that only tolerable mounting inaccuracies in view of possible machining accuracies are given. Particularly, rotatory offsets have strong effects. A twist of a workpiece in the mounting for as few as 0.01° will, in a workpiece with parts 200 mm remote from the mounting, lead to a displacement of those remote parts for about 35 μm from the ideal position, which is inacceptable.

For this reason, a method is to mount the workpiece as precisely as possible, then to measure the workpiece in the mounting for detecting translatory and/or rotatory displacements/offsets of the workpiece in the real mounting in comparison with an ideal mounting. Then, in accordance with the detected offset, the machining data relating to the ideal mounting are numerically transformed towards the real position. Then, without changing the mounting, workpiece machining in accordance with the changed data is made. So, finally, one does not bring the real workpiece towards the ideal data. Rather, vice versa, the ideal data are transformed towards the real workpiece. In this manner, mounting inaccuracies can be eliminated to some extent.

FIG. 1a shows the situation schematically in a two-dimensional cut in a machine coordinate system x-y. Assumed is a body 9 (for example a turbine blade) to be provided with a hole 8-1, 8-2 (for example for cooling fluid) that requires precise positioning. Item 1 is the surface of the body in the ideal mounting, 8-1 the (future) hole in the ideally mounted position. Item 2 is the surface in real mounting, and the (future) hole 8-2 is at a displaced position. The translatory displacement is shown, as an example, by arrow 3a at the lower left corner, wherein said arrow constitutes a displacement vector with x- and y-components. The rotatory displacement is indicated by angle 3b.

In a three-dimensional space the relationships are qualitatively the same. The displacement vector is, however, a three-dimensional quantity, and one has three degrees of freedom for angular displacement and, thus, altogether six quantities to be determined.

FIG. 1b shows the interrelation of the ideal and the real coordinate system. System xi-yi-zi symbolizes the ideal coordinate system which may, for example, be the machine coordinate system. System xr-yr-zr symbolizes the real coordinate system. The latter is displaced against the former by displacement vector vv=(xv, yv, zv) by translation and is rotatory displaced around plural axes by angles λv, βv, φv. The relation between a point/vector vi in the ideal coordinate system and a point/vector vr in the real coordinate system can mathematically be expressed as follows:

$$vr = k*D(\lambda v, \beta v, \phi v)*vi + vv,$$

wherein $D(\lambda v, \beta v, \phi v)$ in three-dimensional computings is a 3*3 matrix effecting the rotation, and k is a scaling factor. By said formula a coordinate point in the ideal system can be transformed into a point in the real system, when xv, yv, zv, λv, βv and φv are known. Advantageously, the quantities xv, yv, zv, λv, βv and φv are defined in respect to the ideal coordinate system (machine coordinate system), because this is initially known. In this context it is pointed out that a plurality of descriptions of the transformation between real and ideal coordinate system exist, particularly along other translatory and rotatory axes. These may be selected such that the transformation requires less than the mentioned six parameters (3 translatory (xv, yv, zv), 3 rotatory (λv, βv, φv). However, then, these axes must be determined and described so that computational workload does not decrease, but only changes. When, however, in the workpiece or in the work to be made certain symmetries are given (such as in a circular bore hole), a lower number of parameters for describing the transformation may be sufficient.

The determination of the translatory displacement 3a and of the rotatory displacement 3b can be made such that the real position of plural reference points 2-1, 2-2, 2-3 of the body in its real mounting is measured. The measured values are compared with the expected ideal values of the reference points 1-1, 1-2, 1-3 according to the ideal mounting. In this way a real position and attitude of the body can be determined. With reference to the known ideal position and attitude, then, translatory and rotatory displacement can be determined which may be applied to the machinig data. The US patent cited above describes such a method.

The described method has two disadvantages:

On the one hand, one will hardly ever hit the reference points precisely when measuring them, because, usually, they are not marked, so that a measuring probe can approach them only in their ideal coordinates (because the real ones are unknown), so that a found error may, at least in parts, not be caused by a displaced mounting, but rather by measuring a not correctly hit reference point. To some extent, this problem can be overcome by suitably selecting reference points and access direction of the points and by appropriately designing the algorithm (such as iteration when large deviations are found). However, this makes the method intricate and it must be individually adjusted for every workpiece.

On the other hand, it may happen that a reference point, in reality, does no longer exist. This occurs particularly when workpieces are repaired or in maintenance (such as turbine blades) after many hours of service time. They may show wear or crude mechanical impact (such as bird strike), so that, caused by smaller or larger surface defects, the reference point has disappeared. Surface defects may also be material aggregations because of deformed material or some kind of agglomeration. FIG. 1a shows at 2a a dent in the surface and, accordingly, reference point 2-3 is "in the air" and cannot be measured. When, instead of this reference point, nevertheless something is measured (e.g. the bottom of dent 2a), something wrong is measured and accordingly wrong are the values derived therefrom.

Further relevant prior art are DE 19631620 and DE 3119566.

SUMMARY

It is the object of the disclosed embodiments to provide a reliable method and apparatus for workpiece levelling, which operate reliably also under larger erroneous mountings and for workpieces of non-ideal shape.

This object is accomplished by the features of the independent patent claims.

In a method for workpiece levelling the ideal surface data go through translatory and rotatory variation in relation to the machine coordinate system, and the varied data are respectively compared with measuring data of plural surface points of the workpiece in its real mounting. The variation at which a suitably determined total error (deviation measure) is minimal may be taken as a starting point for the translatory and rotatory offset of the workpiece in its real mounting compared with the ideal mounting. However, it may also be vice versa: The measured data of the surface of the workpiece in its real mounting may go through translatory and/or rotatory variation, and the candidate data generated in this way are compared to ideal workpiece surface data.

A method for workpiece levelling comprises the steps of mounting the work-piece in a machine tool, measuring the position of the workpiece in the mounting and determining a translatory offset xv, yv, zv and a rotatory offset $\lambda v$, $\beta v$, $\phi v$ of the factual workpiece mounting compared to the ideal mounting from the measurement results and from a workpiece data forming an inital data set related to the ideal mounting, wherein for obtaining another initial data set a plurality of surface points of the mounted workpiece are measured in their position xn, yn, zn in space, the data of one of the initial data sets are varied a plurality of times in accordance with plural translatory and rotatory displacements for obtaining a plurality of varied data sets, from the varied data sets and their base data set the one data set is determined that represents a surface with a lowest deviation measure compared to a surface represented by the other of the initial data sets, and the translatory offset xv, yv, zv and the rotatory offset $\lambda v$, $\beta v$, cpv is determined from the translatory and rotatory displacement of the determined data set.

Varying one of the initial data sets as described above may be made with a "best fit" method for generating candidate data sets and judging them with reference to the other initial data set.

Measuring the mounted workpiece is made with redundancy in comparison to the minimum required data quantity for determining the translatory and rotatory offset. Redundancy may be very high, for example factor 10 or 100. Then, good results are also obtained for real surfaces of real bodies. Measuring the workpiece in its real mounting may be made optically, particularly stereoscopically, particularly under particular illumination, such as line illumination, preferably with a scanning laser.

In the following, embodiments of the disclosed embodiments are described with reference to the drawings in which

DETAILED DESCRIPTION OF THE DISCLOSED EMBODIMENTS

Figure 1A:
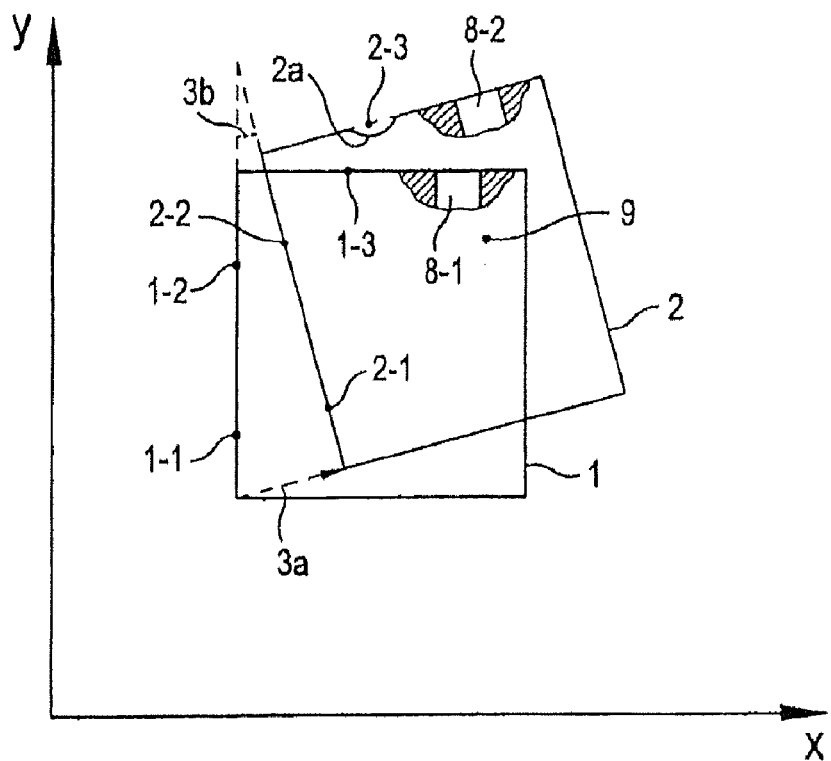
FIGS. 1a & 1b show prior art and unwanted effects therein.
Figure 1B:
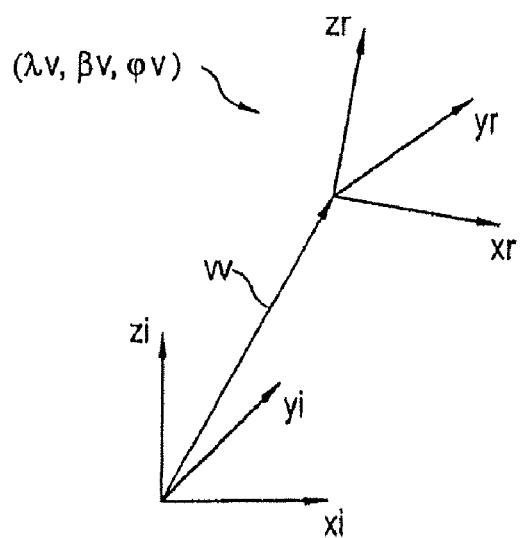

Generally, in this specification same reference numerals shall denote same components. Features described here shall be deemed combinable as far as they do not exclude each other.

Figure 2:
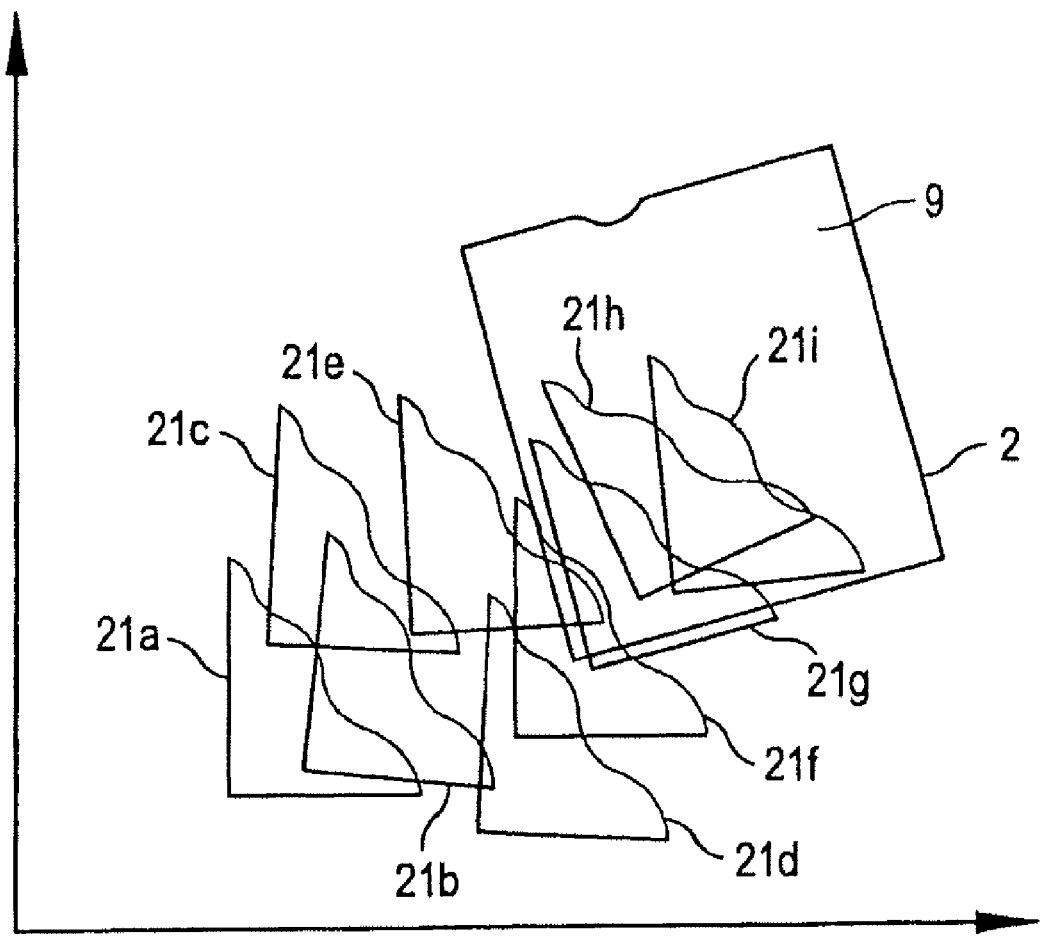
FIG. 2 shows a procedure according to the disclosed embodiments.

In FIG. 2 the x-y axes denote a fixed coordinate system related to the machine. Referring to this coordinate system the tool executes its work at the work-piece. The machining data may refer to this coordinate system or to a coordinate system unambiguously related thereto. The drawings only show two dimensions. The disclosed embodiments, however, are to be considered applicable in a three-dimensional space. Translation of a workpiece may particularly be given along three translatory degrees of freedom (x, y, z) and along three rotatory degress of freedoms ($\lambda$, $\phi$, $\beta$).

In FIG. 2, reference numeral 20-$n$ designates different variations of an initial data set, which, in the shown example, is a data set representing the workpiece surface. The variations may be made along translatory and/or rotatory degrees of freedom. They may be made along one degree of freedom, e.g., x-axis, or along plural degrees of freedom. The respective variation renders respectively one data set representing the workpiece surface in a varied position.

The varied positions (and also the initial data set) generated in this way are respectively individually compared with the measured position of the workpiece, and a total error measure (deviation measure) is formed.

It is pointed out that not the overall surface must be included into the comparison. Sections thereof may be sufficient. The section under consideration will generally be selected in such a way that therein every possible position error to be detected is sufficiently clearly reflected. Particularly, the measured section may be or comprise a section comparatively remote from the mounting (more than 70% or more than 80% or 90% of the maximum possible distance along the workpiece). There, particularly rotatory errors (angle displacement at the mounting) are reflected sufficiently clearly.

Figure 3:
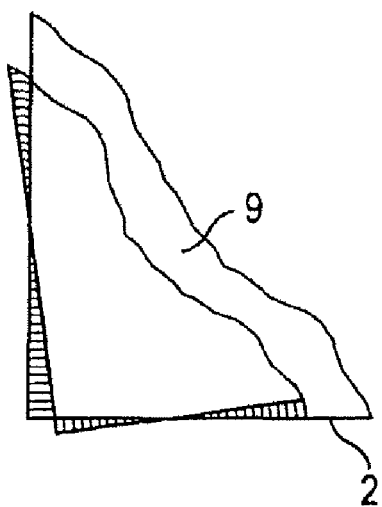
FIG. 3 shows a possible first embodiment of error determination.

The error determination may, e.g., be made as indicated in FIG. 3 by determining the distance of a point on the varied surface from the measured surface. The magnitudes or squares of the distances of all points may be added up and may, thus, form an error or deviation measure for one variation. Distance determination may, in a mathematically easy manner, be made by vector representation of points, surfaces and verticals in relation thereto and by resolving the thus appearing equations.

Within each data set plural points may be evaluated as described above, particularly more than n points, n=10 or 50 or 100 or 200 or 1000 or 5000, distributed across the surface section under consideration. For one variation, then n individual errors appear which may be processed as described above to the total error of the respective variation. Through this, different variations appear, each coming from a known translatory and rotatory displacement and having a respective error measure.

Then, that error variation is selected that shows the smallest error measure. The translatory and rotatory displacement of this variation from the initial position corresponds most closely to the real translatory and rotatory displacement of the workpiece in its real mounting compared to an ideal position and attitude, this appearing from the smallest error measure. Through this, in accordance with the translatory and rotatory displacement of the variation with the smallest error measure, the translatory and rotatory offset of the workpiece in its real mounting can be determined. In a simple case, the translatory and rotatory displacement of the variation with smallest error measure may immediately be taken as translatory and rotatory offset of the workpiece (potentially sign-corrected when the measured surface is varied and compared with the ideal surface). However, likewise, an iteration may be used, what is described below.

Variation of translation and rotation may be made in a controlled, non-random manner, for example by evaluating their effects on the error (total error, deviation measure) and using it for determining another variation. When the error becomes smaller by varying a parameter, the parameter will be varied in the same direction, and otherwise in the other direction. When an error minimum has been passed, the variation with the so-far smallest error is taken and, starting therefrom, another parameter that has not been varied so far will be varied, particularly as described above. When plural or all parameters or degrees of freedom (x, y, z, λ, β, φ) have been varied in this manner, another pass of variations of the parameter may be made, possibly with smaller step widths.

When a stop criterion is met (such as a predetermined number of variations/iterations, error smaller than a predetermined measure), the translatory and rotatory displacement of the variation with the smallest error measure may be used for determining the displacement.

Figure 4A:
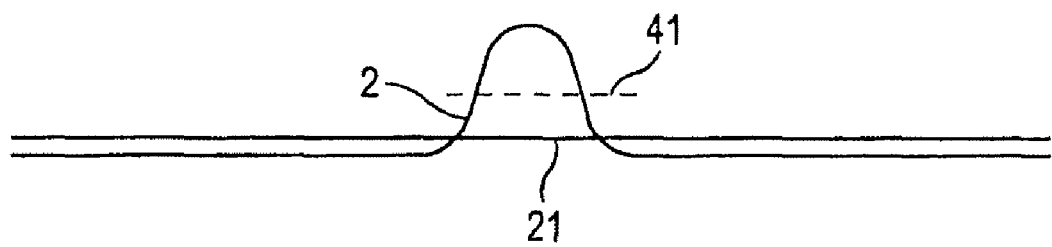
FIGS. 4a & 4b show a possible particular embodiment of error determination.

Generally, points on surface sections of the measured workpiece surface having surface defects may be omitted from the above described error determination. The reason is that defects may lead to large, non-compensable errors that "pull" the assumed correct approximation systematically into a wrong direction, as explained with reference to FIG. 4. In FIG. 4a the curve shows a surface section with a defect (dent), and the line shows an assumed well approximated surface, because it shows, based on the selected error determination, a smallest error measure.

Figure 4B:
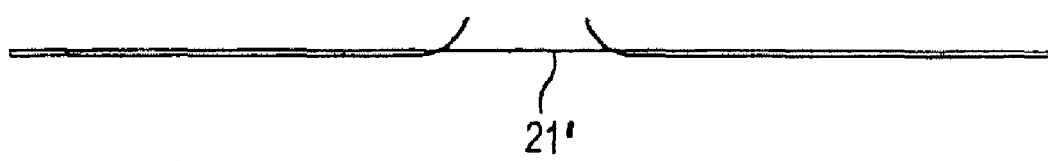

According to FIG. 4b the defective surface section (points thereon) may be left out at error determination, and the comparison between varied surfaces (surface sections) and an initial surface is made without including the points of the left-out section. Defective surface portions can be recognized in different manners, particularly by manual input, by automatic optical recognition or by evaluating the measurement data. A further possibility is to make a first determination of translatory and rotatory displacement, to compare on this basis the measured surface with the ideal surface and to leave out all those sections of the measured surface that meet a particular criterion, such as exceeding a particular absolute or relative distance (in comparison to other sections). On the basis of the reduced surface sections, varying and comparing is repeated as in an iteration.

In this manner, sections remain out of consideration that would make a translatory or rotatory displacement appear to be correct that has systematically been pulled in a wrong direction.

When a surface defect has been recognized as described above, in accordance therewith an indication or a warning may be output and/or machining data may be varied. The variation of the machining data may include a displacement in a manner that a displacement of the machining spot on the workpiece surface is computationally taken into account, e.g., for adjusting the attitude of a machining portion on the surface. The variation may, however, also reach as far as a completely new calculation of the machining to be made.

Figure 5:
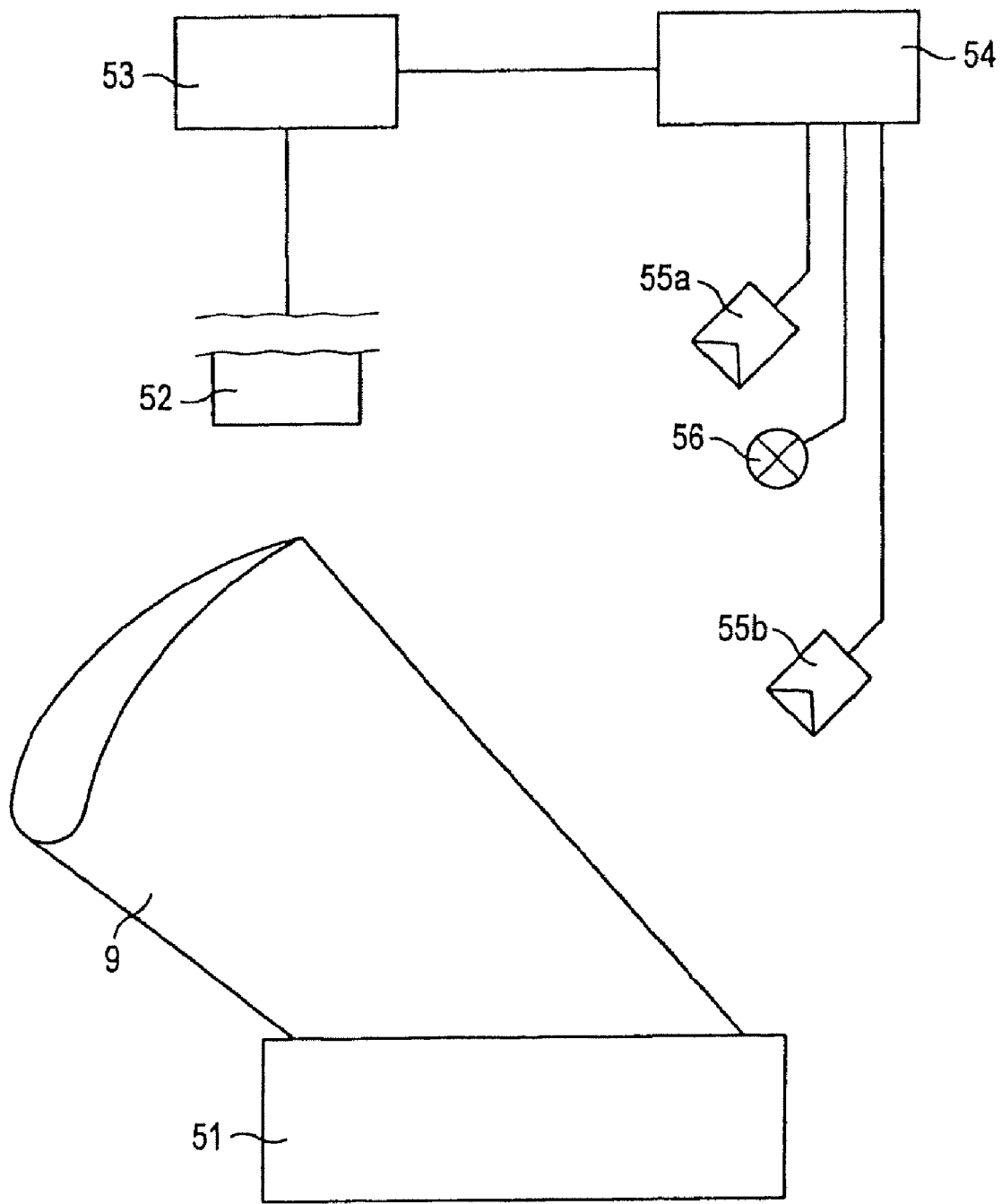
FIG. 5 shows an apparatus according to the disclosed embodiments.

FIG. 5 shows an apparatus for workpiece levelling and workpiece machining. 52 is a tool, for example a laser ablation apparatus, which machines a workpiece 9 in accordance with machining data, particularly by drilling or layer-wise ablation. The workpiece itself is mounted in a mounting 51.

symbolizes a measurement means. It may operate optically and may comprise an optical pickup such as a camera with suitable resolution. It may operate stereoscopically and may comprise two or more pickups 55a, 55b, picking up the workpiece from different points of view. A particular illumination means 56 may be provided, particularly a line illumination, for example a laser, which may also scan the workpiece in the section of interest. The complete optical measuring means may be displaceable for picking up—also same—surface sections from different points of view and measuring them in this manner. The number of the finally obtained measurement points of the workpiece surface is to some extent selectable or adjustable. A—non-severe—upper limit is for optical pickups given by their resolution power and possibly also by computation time considerations. Instead of optical pickups also other pickups are possible, such as one or more mechanical point sensors which serially scan the surface at the desired number of positions.

54 symbolizes a control or feedback control determining the measurement values of the workpiece surface and formatting them suitably, if necessary. In optical measurement means it may, according to given algorithms, extract surface data from the image data in a desired format and may supply them for evaluation and control 53. The latter has plural purposes and, accordingly, means, namely controlling the above-described variations, making error judgement, possibly with iteration, and so on, determining the displacement of the really mounted workpiece in comparison to the ideal mounting, modifying the machining data in accordance with the determined translatory and rotatory offset, and controlling workpiece machining in accordance with the determined offset.

What is claimed is:
1. A method for workpiece levelling, comprising:
   mounting a workpiece in a machine tool,
   measuring a position of the workpiece in its mounting and determining a translatory offset (xv, yv, zv) and a rotatory offset (λv, βv, φv) of a real workpiece mounting in relation to an ideal mounting from measurement results and from workpiece data forming an initial data set and related to the ideal mounting,
   the method further comprising:
   measuring plural surface points of the mounted workpiece in their position in space (xn, yn, zn) for obtaining another initial data set,
   obtaining plural varied data sets by varying the data of one of the initial data sets a plurality of times in accordance with plural translatory and rotatory displacements, for each varied data set and the initial data set on which they were based, determining a deviation measure for the respective surface represented thereby in comparison to a surface represented by the other of the initial data sets, determining the smallest deviation measure from the various deviation measures, and determining the translatory offset (xv, yv, zv) and the rotatory offset (λv, βv, φv) from the translatory and rotatory displacement of the data set having the determined smallest deviation measure.

2. The method in accordance with claim 1, wherein the translatory and rotatory displacement of the determined data set is taken as the translatory offset (xv, yv, zv) and the rotatory offset (λv, βv, φv).

3. The method of claim 1, further comprising:
eliminating points from the data set having the determined smallest deviation measure which are more than a predetermined value distant from the surface given by the workpiece data,
eliminating points in the other data sets corresponding to the eliminated points, and repetitively:
determining a deviation measure for the respective surface represented thereby in comparison to a surface represented by the other of the initial data sets,
determining the smallest deviation measure from the various deviation measures, and
determining the translatory offset (xv, yv, zv) and the rotatory offset (λv, βv, φv) from the translatory and rotatory displacement of the data set having the determined smallest deviation measure,
with the remaining data sets.

4. The method in accordance with claim 1, further comprising making an optical measurement to obtain the another initial data set.

5. The method according to claim 1, further comprising measuring at least 10 surface points.

6. The method according to claim 1, wherein the variation for determining a new data set is made in accordance with one or more already determined deviation measures.

7. The method according to claim 1, wherein the one of the initial data sets is the data set of the workpiece data referenced to the ideal mounting, and that the other of the initial data sets is the data set of the workpiece data based on the workpiece measurement.

8. The method according to claim 1 wherein the one of the initial data sets is the data set of the workpiece data based on the workpiece measurement, and that the other of the initial data sets is the data set of the workpiece data referenced to the ideal mounting.

9. A method for workpiece machining, comprising:
workpiece levelling in accordance with claim 1,
changing the workpiece data referenced to the ideal mounting in accordance with the determined translatory offset (xv, yv, zv) and the rotatory offset (λv, βv, φv), and
machining the workpiece in accordance with the changed workpiece data.

10. The method of claim 3, in which a surface defect is recognized in accordance with which an indication or warning is output and/or machining data are varied.

11. An apparatus for workpiece levelling, comprising:
a mounting for the workpiece in a machine tool,
a measuring means for measuring the position of the workpiece in the mounting, and
a determining means for determining a translatory offset (xv, yv, zv) and a rotatory offset (λv, βv, φv) of the real workpiece mounting compared to an ideal mounting from the measurement results and from workpiece data forming an initial data set referenced to the ideal mounting,
wherein:
the measuring means measures the workpiece at a plurality of surface points of the mounted workpiece in their position in space (xn, yn, zn), for obtaining another initial data set,
the determining means comprises a varying means varying the data of one of the initial data sets in accordance with plural translatory and rotatory displacements a plurality of times,
the determining means comprises a deviation determining means determining for each of the varied data sets and the initial data set on which they are based a deviation measure for the respectively represented surface compared to a surface represented by the other of the initial data sets,
the determining means comprises a selecting means which determines from the determined deviation measures the lowest deviation measure, and
the determining means comprises an offset determining means determining the translatory offset (xv, yv, zv) and the rotatory offset (λv, βv, φv) from the translatory and rotatory displacement of the data set having the lowest deviation measure.

12. The apparatus according to claim 11, wherein the measurement means comprises an optical pickup.

13. The apparatus according to claim 11, wherein the measuring means comprises plural optical pickups mounted at different locations which may be displaceable.

14. The apparatus according to claim 11 further comprising using the apparatus to level the workpiece by:
a method for workpiece levelling, comprising:
mounting a workpiece in a machine tool,
measuring a position of the workpiece in its mounting and determining a translatory offset (xv, yv, zv) and a rotatory offset (λv, βv, φv) of a real workpiece mounting in relation to an ideal mounting from measurement results and from workpiece data forming an initial data set and related to the ideal mounting,
the method further comprising:
measuring plural surface points of the mounted workpiece in their position in space (xn, yn, zn) for obtaining another initial data set,
obtaining plural varied data sets by varying the data of one of the initial data sets a plurality of times in accordance with plural translatory and rotatory displacements,
for each varied data set and the initial data set on which they were based, determining a deviation measure for the respective surface represented thereby in comparison to a surface represented by the other of the initial data sets,
determining the smallest deviation measure from the various deviation measures, and
determining the translatory offset (xv, yv, zv) and the rotatory offset (λv, βv, φv) are determined from the translatory and rotatory displacement of the data set having the determined smallest deviation measure.

15. An apparatus for workpiece machining comprising:
a workpiece levelling apparatus, and an apparatus for workpiece levelling, the apparatus for workpiece levelling comprising:
a mounting for the workpiece in a machine tool,
a measuring means for measuring the position of the workpiece in the mounting, and a determining means for determining a translatory offset (xv, yv, zv) and a rotatory offset ($\lambda$v, $\beta$v, $\phi$v) of the real workpiece mounting compared to an ideal mounting from the measurement results and from workpiece data forming an initial data set referenced to the ideal mounting, wherein:

the measuring means measures the workpiece at a plurality of surface points of the mounted workpiece in their position in space (xn, yn, zn), for obtaining another initial data set, the determining means comprises a varying means varying the data of one of the initial data sets in accordance with plural translatory and rotatory displacements a plurality of times, the determining means comprises a deviation determining means determining for each of the varied data sets and the initial data set on which they are based a deviation measure for the respectively represented surface compared to a surface represented by the other of the initial data sets, the determining means comprises a selecting means which determines from the determined deviation measures the lowest deviation measure, and the determining means comprises an offset determining means determining the translatory offset (xv, yv, zv) and the rotatory offset ($\lambda$v, $\beta$v, $\phi$v) from the translatory and rotatory displacement of the data set having the lowest deviation measure a workpiece data change means transforming the ideal machining data in accordance with the determined translatory offset (xv, yv, zv) and the rotatory offset ($\lambda$v, $\beta$v, $\phi$v) into real machining data, and a machining means working the workpiece in accordance with the real machining data.

16. The apparatus according to claim 15, wherein the machining means is a laser machining means.

* * * * *